(12) United States Patent
Stanley et al.

(10) Patent No.: US 8,399,859 B2
(45) Date of Patent: Mar. 19, 2013

(54) RADIATION DETECTOR

(75) Inventors: Steven John Stanley, Warrington (GB); Simon John Doran, Surrey (GB); Paul Michael Jenneson, Hampshire (GB)

(73) Assignee: Nexia Solutions Limited (GB)

( * ) Notice: Subject to any disclaimer, the term of this patent is extended or adjusted under 35 U.S.C. 154(b) by 261 days.

(21) Appl. No.: 12/742,200

(22) PCT Filed: Nov. 14, 2008

(86) PCT No.: PCT/GB2008/051066
§ 371 (c)(1),
(2), (4) Date: Oct. 6, 2010

(87) PCT Pub. No.: WO2009/063246
PCT Pub. Date: May 22, 2009

(65) Prior Publication Data
US 2011/0017924 A1    Jan. 27, 2011

(30) Foreign Application Priority Data

Nov. 15, 2007 (GB) .................................. 0722416.5

(51) Int. Cl.
*G01N 21/00* (2006.01)
(52) U.S. Cl. .................................................. 250/474.1
(58) Field of Classification Search ................ 250/474.1
See application file for complete search history.

(56) References Cited

U.S. PATENT DOCUMENTS

| | | | |
|---|---|---|---|
| 3,130,306 | A | 4/1964 | Ellery et al. |
| 3,505,523 | A | 4/1970 | Becker |
| 5,134,297 | A | 7/1992 | Harley et al. |
| 7,098,463 | B2 | 8/2006 | Adamovics |
| 2001/0052572 | A1 | 12/2001 | Mikami et al. |

(Continued)

FOREIGN PATENT DOCUMENTS

| | | |
|---|---|---|
| JP | 9192024 | 7/1997 |
| WO | 0203097 | 1/2002 |
| WO | 2005106532 | 11/2005 |

OTHER PUBLICATIONS

Sohnius, B. et al. "Sensitivity of the fission track detector Makrofol KG to damage by different radiations." Nuclear Instruments and Methods in Physics Research Netherlands, vol. 197, No. 2-3, Jun. 15, 1982, pp. 449-452.

(Continued)

*Primary Examiner* — David Porta
*Assistant Examiner* — Hugh H Maupin
(74) *Attorney, Agent, or Firm* — Marianne Fuierer; Moore & Van Allen, PLLC

(57) ABSTRACT

The invention provides a device for the detection and mapping of radiation, the device comprising a polymeric core located within an external shell material, wherein the polymeric core comprises at least one radiation sensitive component and the external sheath comprises a collimation sheath. Preferably, the polymeric core comprises a spherical core which is encased within the external shell. The external shell is preferably comprised of a metal, most preferably lead or tungsten. The invention also provides a method for the detection and mapping of radiation in a location, which comprises: (a) placing a device according to the invention in the location to be investigated; (b) allowing the device to remain in the location and be exposed to the radiation for a predetermined length of time; (c) removing the device from the location; (d) removing the polymeric core from the external shell; and (e) analysing said polymeric core by means of an optical analysis technique applying a software-based image reconstruction algorithm in order to determine the location, form and intensity of said radiation. The device and method of the invention facilitate the detection and mapping of radiation, and find particular use in mapping the location, intensity and identity of radio-logical hazards in 3 dimensions in sites such as active cells, gloveboxes, other active plants and confined spaces. Advantages over the prior art include the lack of requirement for an electrical supply, and the ability to deal with high radiation backgrounds and to be deployed in confined or restricted spaces.

15 Claims, 5 Drawing Sheets

U.S. PATENT DOCUMENTS

2007/0020793 A1    1/2007    Adamovics

OTHER PUBLICATIONS

Doran S.J. et al. Optical CT scanning of PRESAGE™ polyurethane samples with a CCD-based readout system. Journal of Physics: Conference Series 3 (2004) pp. 240-243.

Guo, P.Y. et al. Characterization of a new radiochromic three-dimensional meter. Med. Phys. 33 (5), May 2006, pp. 1338-1345.

Guo, P.Y. et al. Simple 3D validation experiments for PRESAGE™/optical-CT dosimetry. Journal of Physics: Conference Series 56 (2006) pp. 187-190.

RADIATION DETECTOR

CROSS-REFERENCE TO RELATED APPLICATIONS

This application is filed under the provisions of 35 U.S.C. §371 and claims the priority of International Patent Application No. PCT/GB2008/051066 filed on Nov. 14, 2008, which in turn claims priority of Great Britain Application No. 0722416.5 filed on Nov. 15, 2007, the contents of which are incorporated by reference herein for all purposes.

FIELD OF THE INVENTION

The present invention is concerned with the detection and mapping of radiological hazards. More specifically, it relates to a novel device that facilitates mapping of the location, intensity and identity of radiological hazards.

BACKGROUND TO THE INVENTION

Numerous applications exist for techniques which are capable of detecting and accurately measuring the presence of radiation and, more specifically, which have the facility for measuring and mapping radiation dose distributions in three dimensions with high spatial resolution. Such techniques find application in, for example, the assessment of radiation therapy techniques in the medical field, and in the detection and characterisation of potential radiation hazards in the nuclear and related industries.

In the context of radiation therapy, the use of aqueous gels containing Fricke dosimeter solution in combination with magnetic resonance imaging techniques has been suggested by Gore, J. C., et al., Phys. Med. Biol. 29:1189-1197; 1984, and further investigated by, inter alia, Schulz, R. J., et al., Phys. Med. Biol. 35:1611-1622; 1990, and Day, J. J. Phys. Med. 35:1605-1609; 1990, and the ability of this technique to map the dose distributions of the complex irradiations used in stereotactic radiosurgery have subsequently been demonstrated. However, such techniques suffer from a major disadvantage that is intrinsic to the Fricke gel medium, wherein ferric ions are able to diffuse quite freely through the gel after irradiation, thereby leading to a gradual blurring of the radiation dose pattern and a consequent loss of spatial resolution.

Several other dosimetry systems which employ gels or polymerisable resins are known from the prior art. Thus, U.S. Pat. No. 4,430,258 discloses a method of producing liquid equivalent solid gamma ray calibration standards which involves adding a first organic solvent to a calibrated aqueous solution of radioactive material to form a first solution; mixing the first solution with a polymerisable resin dissolved in a second organic solvent together with a hardening catalyst to form a second solution; and curing the second solution, whilst U.S. Pat. No. 4,588,698 discloses microencapsulation of solid phase scintillators in gels selectively permeable to diffusible radioactive label, these encapsulated scintillators being used to monitor the concentration of radioactive-tagged substances in fluid systems.

U.S. Pat. No. 4,350,607 discloses a radiation detector and dosimeter based on a finely-dispersed liquid suspended in a host liquid of high viscosity or gel. When radiation, and particularly neutron radiation of sufficient energy and intensity, comes into contact with such droplets, this can trigger volatilisation of the droplets, such that the volume of vapour evolved then serves as a measure of radiation intensity and dosage.

U.S. Pat. No. 4,779,000 discloses a direct reading, self-powered detector and dosimeter for gamma rays, and other low LET radiation, and optionally microwaves wherein a transparent elastic solid medium contains uniformly dispersed droplets of a very high vapour pressure detector liquid substantially immiscible with the elastic solid, the vaporisation of said droplets being sensitive to lightly ionizing radiation such as gamma rays and microwave radiation. Thus, the solid medium retains a record of each droplet vaporised, the number being proportional to the radiation dose.

U.S. Pat. No. 5,321,357 teaches a detection system wherein a visible and/or MRI visualisable permanent image is formed in a gel in a container which maintains the gel a dimensionally stable shape. A radiation polymerisable monomer is uniformly dispersed in the gel in storage stable form in a concentration effective to form an insoluble polymer in the gel which alters the relaxation time of the solvent phase of the gel in any area in which the polymer is formed. Polymerisation of the monomer is initiated in exposed areas by incident radiant energy, the resulting image being representative of the dose distribution of the radiant energy to which the gel is exposed. In a preferred embodiment, the gel contains a mixture of a linearly homopolymerisable monomer, e.g. a vinyl monomer, and a comonomer which is crosslinkably copolymerisable with the monomer, e.g. a monomer with two vinyl groups.

Optical scanning tomography is the subject of U.S. Pat. No. 6,218,673, wherein there is disclosed an optical scanner which provides three dimensional dosimetric data by scanning, with at least one light beam, a translucent medium exhibiting optical properties which change upon receipt of radiant energy representing a dose distribution of the energy. At least one detector is employed to gather data indicative of changes in the optical properties of the medium after scanning from multiple directions, thereby providing a representation of the optical properties in sections through the medium. Typical optical properties measured include optical density, light scattering, emitted light intensities, and combinations thereof, and the patent also describes methods of reconstructing a three-dimensional energy field as a series of two-dimensional images by applying an energy field to a translucent medium having distinct optical properties that change upon receipt of the energy field, optically scanning the translucent medium at various angles, detecting and measuring data indicative of optical changes in the medium, and preparing a two-dimensional image of the energy field by analyzing the changes in the optical properties.

WO-A-2004/079393 is concerned with a three-dimensional dosimeter for penetrating radiation, and describes a method of forming a three-dimensional dosimetric map in a solid translucent or transparent polymer and an article of manufacture comprising a polymer formulated to capture data imparted by incident penetrating radiation. The detects and displays a dose or doses of penetrating radiation by forming within the polymeric matrix a 3D dosimetric map which is measurable and quantifiable by known procedures. The dosimetric map is representative of the 3D distribution of the dose or doses of the penetrating radiation to which the polymer had been exposed and can be quantified at high spatial resolution, thereby providing an accurate, stable, storable record in three dimensions of the radiation exposure or dosing event(s).

Devices for the detection and measurement of radiation in industrial plants, such as the Radscan® 800 (available from BIL Solutions Ltd.), may be obtained commercially, and offer a convenient means for providing colour contour maps showing the spread and intensity of radiation over an area. Such devices are particularly useful when large areas require surveying, or in instances where access may be limited due to physical constraints or safety considerations, and they find particular application in, for example, the investigation of spillages of radioactive material, or the identification of γ-hotspots during nuclear decommissioning operations. The Radscan® 800 comprises an optical arrangement which includes a CCD camera and laser range finder which operate in conjunction with caesium iodide detector attached to a photodiode and amplifier, these components being housed within a tungsten collimator.

The techniques of the prior art do, however, suffer from several disadvantages. For example, many systems—and particularly those associated with radiation therapy applications—demonstrate an inability to perform in high radiation backgrounds. Other common difficulties include practical problems in deployment, due to physical spatial constraints or the remoteness of locations in which investigations are to be performed. Furthermore, cost issues are often highly significant, with systems such as thee Radscan® 800 typically being expensive to purchase.

Thus, the present inventors have sought to address these issues and to provide a system and method for the detection and mapping of radiation which overcomes the difficulties associated with the prior art. The present invention, therefore, provides a means for the detection and mapping of radiation which performs effectively and efficiently in high radiation backgrounds, requires no electrical supply in order to function—and may, therefore, be deployed in a wide variety of locations and circumstances—and is relatively cheap and easy to manufacture.

SUMMARY OF THE INVENTION

Thus, according to a first aspect of the present invention, there is provided a device for the detection and mapping of radiation emitted by radioactive materials, said device comprising a polymeric core located within an external shell material, wherein said polymeric core comprises at least one radiation sensitive component which is sensitive to said radiation emitted by said radioactive materials and said external shell comprises a collimation sheath.

The radiation emitted by said radioactive materials predominantly comprises gamma-radiation and, therefore, it is essential that said radiation sensitive core component is sensitive to gamma-radiation. However, said emitted radiation may also contain amounts of beta-radiation, in addition to neutron radiation, so it is desirable that said core material is also sensitive to beta-radiation and neutron radiation.

Said polymeric core may be formed in a variety of shapes, including as a sheet. Preferably, however, said polymeric core comprises a cubic, cylindrical or spherical core but, most preferably, said core comprises a truncated spherical (dome-shaped) core. Said core is encased within said external shell which, in each case, is shaped in the same way as the core. Said external shell is preferably comprised of a metal. Most preferably, said metal comprises lead or tungsten.

According to a second aspect of the present invention, there is provided a collimation sheath for use in a device according to the first aspect of the invention. Preferably, said collimation sheath comprises a metal, most preferably lead or tungsten. Said collimation sheaths are removable from the polymeric core material following radiation exposure, and may then be re-used in further devices according to the invention.

Accordingly, said collimation sheath is adapted to fit around said core material, and to be removable therefrom. Said collimation sheath has the same shape as the polymeric core material around which it is designed to fit and, therefore, it preferably has a cubic, cylindrical or spherical shape but, most preferably, comprises a dome-shaped truncated sphere. In order to allow said sheath to fit around said core material it comprises two sections which, optionally, may be interconnected. Thus, said collimation sheath may comprise a hinged arrangement, whereby said shell closes around said core material. Preferably, however, said sheath comprises two separate sections which essentially form a base and a lid, the core material being placed in the base section, and the arrangement then being completed by placing the lid thereon, the lid being adapted so as to closely cooperate with the base section and close around the core material. In addition, said lid may be held in position by placing holding means around the exterior of said collimation sheath. Said holding means may comprise, for example, an arrangement of straps, or a continuous covering comprising a flexible sheet or film.

The material from which said collimation sheath is essentially opaque to the radiation emitted by radioactive materials, but said sheath comprises a plurality of holes through its surface, said holes allowing said radiation which is incident on said sheath to pass through said sheath such that the tracks of said radiation may be captured by the polymeric core material. Said plurality of holes in said sheath preferably comprises a plurality of pinholes.

According to a third aspect of the present invention, there is provided a method for the detection and mapping of radiation in a location, wherein said method comprises:
  (a) placing a device according to the first aspect of the invention in the location to be investigated;
  (b) allowing said device to remain in said location and be exposed to said radiation for a predetermined length of time;
  (c) removing said device from said location;
  (d) removing the polymeric core from the external shell; and
  (e) analysing said polymeric core by means of an optical analysis technique applying a software-based image reconstruction algorithm in order to determine the location, form and intensity of said radiation.

Preferably, said analysis of said polymeric core material is carried out by means of optical tomography in order to digitise the opacity of the core in three dimensions, with subsequent application of a reverse ray tracing technique in order to back-project the location and nature of the radiation by utilising a knowledge of the positional placement of the design and the assigned cell/confined space geometry.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

DESCRIPTION OF THE INVENTION

The device of the present invention is based on a polymeric core material comprising at least one radiation sensitive material which is located within an external shall material comprising a collimation sheath. The device and method of the invention facilitate the detection and mapping of radiation, and find particular use in mapping the location, intensity and identity of radiological hazards in 3 dimensions in sites such as active cells, gloveboxes, other active plants and confined spaces.

The device typically has a truncated spherical shape and a diameter in the region of 5-20 cm, most conveniently around 10 cm. A basic spherical shape has been shown to provide the most satisfactory and efficient embodiment of the invention, and the truncated spherical shape has the advantage that it allows for the device, in operation, to be placed on a flat surface. In the event that the device is to be suspended in space, a perfect spherical shape may, of course, be employed. For any given device according to the invention, the shape of the core material will naturally conform to that of the shell.

The inventors have found that the truncated spherical shape offers the most efficient means for achieving optimum coverage for the monitoring of radiation which is incident from all directions. The size of the core is chosen with a view to issues such as practicalities with deployment, the depth of material required to successfully capture different energies of incident radiation, and the spatial resolution of the optical tomography system which is used to digitise the data from the polymeric core after irradiated and removal from the area under examination.

The shell is designed with a view to certain very specific requirements. Thus, for example, the thickness of the sheath should be sufficiently small as to not geometrically restrict the incident radiation through the collimation holes. However, it is also required to be sufficiently thick to stop radiation in regions of the core not adjacent the collimation holes in order to achieve the required degree of contrast.

The core material comprises a polymeric material which is sensitive to radiation emitted by a radioactive material. Principally, said radiation comprises gamma-radiation, such as that emitted by, for example, cobalt 60 ($^{60}$Co) or caesium 137 ($^{137}$Cs). Said radiation may also comprise beta-radiation and neutron radiation. It is a key requirement of the invention that the polymeric core should be sensitive to such radiation. However, said polymeric core may also be sensitive to visible light and other energies of electromagnetic radiation although, at background levels, the level of responsiveness of said polymeric core is not very high. Thus, whilst it is advisable that said polymeric core material should be stored away from bright light, in operation the radiation levels generated as a result of the presence of gamma emitting radiation within a space to be surveyed by the device would always be much higher than the standard background radiation levels.

Said polymeric core comprises a single polymeric piece, moulded in the desired shape, preferably a truncated sphere. Suitable polymeric materials having the required radiation sensitivity form transparent moulded pieces prior to use, which become opaque following exposure to radiation. Specific materials which may be used in the context of the present invention include, for example, epoxy and polyurethane polymers or combinations thereof.

Suitable polyurethanes are typically prepared by the reaction of polyisocyanates with polyols. Said polyisocyanates generally comprise diisocyanates, which may be aryl diisocyanates, aliphatic diisocyanates, cycloalkyl diisocyanates or heterocyclic diisocyanates, or triisocyanates, such as isocyanate trimers or biurets having three isocyanate groups. Suitable polyisocyanates include, for example, 1,6-hexamethylene diisocyanate and isophorone diisocyanate. Useful polyols may be selected from a wide range of organic compounds which comprise two or more hydroxyl groups, with diols and triols being amongst the most suitable materials, typical examples including monomeric polyols such as ethylene glycol and glycerol, as well as polymeric polyols, for example hydroxyl-terminated polyether or polyester polyols. A particularly suitable material in the context of the present invention is the commercially available polyurethane PRESAGE™, available from Heuris Pharma LLC, 412 Sunset Rd., Skillman, N.J. 08558, USA. Alternatively, good results may be obtained by using BANG™ polymer gel dosimeters, supplied by MGS Research, Inc., 1 Orchard Park Road, Suite 13, Madison, Conn. 06443, USA.

Preferably, said polymeric core material also comprises a colour change material, which is colourless prior to exposure to radiation but can provide a coloured image after radiation exposure, to allow analysis of the exposed material to be more readily performed. Suitable colour change materials for this purpose include leuco compounds of various fluorans or di- or triarylmethane dyes, such as Leuco Malachite Green or Crystal Violet Lactone.

Said shell, or collimation sheath, comprises a metallic casing, adapted to surround the polymeric core material and having the same shape as that material, preferably a truncated sphere. The shell may comprise a hinged arrangement of upper and lower sections, but more preferably comprises two separate, detachable components which fit together to form the shell, preferably in the shape of a truncated sphere. Preferably, the two components are of comparable size, and include engaging means adapted to secure the two components as a single shell around the core material. Thus, in the most preferred embodiment, the collimation sheath preferably comprises a base section and an upper section; the polymeric is placed in the base section, and the top section of the sheath then fits over the core and onto the sheath bottom section, with the joint between the top and bottom section being stepped to enable a good fit.

The top section of the sheath typically may rotate independently from the bottom section and, when the device is in operation, said lid is preferably held in position by holding means located around the exterior of said collimation sheath, and said holding means may comprise an arrangement of straps or a continuous covering. Preferably, said arrangement of straps comprises straps formed from a suitable plastics material, most preferably a low density plastics material comprising, for example, polyethylene, whilst said continuous covering comprising a flexible plastic sheet or film, which typically comprises low density polyethylene or poly(vinyl chloride). Alternatively, some temporary means of adhesion, such as adhesive tape, may be employed as holding means, to secure the upper and lower sections together.

In certain embodiments, no separate means is employed to secure the core into the sheath, and the sheath is designed to fit tightly around the core, thereby restricting rotational movement. Alternatively, the collimation sheath may be designed such that the polymeric core may only be placed within said sheath in one specific configuration, such that it is thereby held in place in the said configuration. Said arrangement may, for example, require the core to be located on one or more small protrusions such as spikes, preferably two spikes, located on the inside of the base of the sheath.

The shell is comprised of a suitably dense metal which is essentially impermeable to the radiation which is emitted by the radioactive source. In addition, said shell comprises a metal which is machinable and/or castable into a collimation sheath. The choice of metal is generally dependent on the nature of the incident radiation to which the device is to be exposed, but suitable materials include iron, steel, gallium, and other metallic alloys. Most preferably, however, said metal comprises lead or tungsten.

The thickness of said shell material is typically from 1 to 15 mm, preferably from 2 to 10 mm, but is most preferably in the region of 5 mm. Transmission of the radiation through the shell to the core material is achieved by providing said shell with a plurality of holes, which penetrate through the shell and allow the radiation to pass through to the core. In this way, the shell functions as a collimation sheath, and serves to orientate and focus the radiation onto the core material in a similar manner as, for example, a collimator in an optical spectrophotometer.

The holes in the collimation sheath are pinholes which cause the incident radiation tracks to be captured inside the polymeric core. The holes restrict the paths of the incident radiation into the polymeric core in regions not adjacent the holes. Thus, radiation delivered through the holes produces radiation tracks or shine paths in the core, thereby providing information concerning the directionality of the radiation. In addition, the depth of the tracks provides information relating to the source of the radiation energy which may facilitate the identification of different isotopes. Such information may also be gleaned from differences in the opacity in regions adjacent and not adjacent the collimation holes, which can allow for estimate of the ease of attenuation of the radiation, thereby offering an alternative means for identification of different isotopes.

The cross-sectional area of the holes in the sheath is generally in the region of between 0.5 $mm^2$ and 25 $mm^2$, preferably between 2 $mm^2$ and 10 $mm^2$, but most preferably is in the region of 5 $mm^2$. The holes are typically spaced apart on the surface of the collimation sheath by between 0.25 cm and 2 cm, preferably between 0.5 cm and 1.5 cm, but most preferably, the hole spacing is around 1 cm.

Following exposure of the device to radiation, the shells are removed from the core material by separating the different sections of the sheaths. The sheaths may then be re-used for further radiation detection and mapping procedures, by enclosing new samples of polymeric core materials therein, whereas the core materials, once exposed, are of course not reusable.

In the method according to the third aspect of the invention, the device according to the invention is placed in a location to be investigated. The device may simply be placed manually by an operator, or remotely by means of a manipulator or remote arm. In further embodiments, the invention envisages the use of a purpose built mechanical device for such purposes, for example, when the device is to be deployed in particular physical locations and requires handling in situations such as through a cave wall, or when suspended from a device such as a crane. Following exposure, the device is then retrieved by reversing the chosen deployment method and, once removed from the area under investigation, the polymeric core material may be removed, generally by hand, from the sheath for subsequent analysis.

Placement of the device is a key aspect of the method of the invention, since a knowledge of the location of the device in relation to the surrounding space is crucial for the accurate mapping and image reconstruction of the incident radiation. Furthermore, placement of the device in a known orientation is extremely important in the context of reconstructing directional information and knowing which directions are north, south, east and west.

Various simple means may be employed in order to ensure that the exact location is known. Thus, for example, the device may be placed next to or close to an item of plant furniture which has a known position and is documented on a technical drawing of the space in question. This space may then be reconstructed in, for example, AUTOCAD which could thereby provide the basis for the image reconstruction. In an alternative approach, some secondary means, such as laser scanning, may be applied to the positioning of the device. A further possibility could be remote deployment of the device on the end of a manipulator or positioning system as previously discussed, thereby allowing the device to be placed in a recordable position.

Simple means may also be applied to ensuring that the orientation of the device in the system under investigation is precisely defined. Thus, for example, the outside of the collimation sheath may be clearly marked with directional arrows, and the device then placed such that the arrows are directed towards known positions. Alternatively, a marked base plate may be employed, with the device being carefully placed on the base plate relative to the markings, which would thereby provide an aid to accurate orientation. In a further alternative embodiment, laser scanning may be employed in order to accurately position the device and, in such a case, it would be necessary for a reflective marking to be incorporated on the outer surface of the collimation sheath. This embodiment also provides the possibility for imaging of the space—for example, cell, glovebox or room, within which the device is deployed.

After being placed in the chosen location, the device is allowed to remain in situ for a predetermined length of time, the length of the time period being determined with reference to the dose of radiation to which the device is exposed. The polymeric core operates optimally for a specific absorbed dose and, therefore, the device must be allowed to remain in situ for a sufficiently long period for the level of this absorbed dose to be attained. It will be apparent that, as a consequence, the higher the dose rate to which the device is exposed, the less is the time of exposure which is necessary.

Typically, exposure of the device takes place to a level of between 5 mGy and 100 Gy, this value being determined by the nature of the chosen polymeric material. There is, of course, an inverse relationship between exposure dose and time of exposure since, as the radiation dose to which the device is exposed increases, so the length of time required in order to attain a desired level of exposure decreases, and vice versa.

In practice, however, it is found to be almost impossible to ensure that each batch of polymer which is used as the core material is exactly the same and, consequently, each core is found to have a slightly different sensitivity, and account has to be taken of this phenomenon. It follows, therefore, that an estimate of the radiation levels prior to deployment of the device, whilst not essential, would generally provide useful information. One means to obtain such information would be by the use of a simple radiation detector to provide a reading of overall radiation levels.

However, alternative means are also available for this purpose. Thus, in practice, suppliers of polymeric core materials provide a number of polymeric cores from a particular batch, together with several small cuvette samples and, by use of these cuvette samples, estimates of the level of radiation in a particular environment may be obtained. Hence, a cuvette sample may be placed within the domain of interest for a known period of time and then analysed in order to estimate the strength of the radiation field.

In addition, said cuvette samples are also useful for calibration purposes wherein, prior to deployment of a device according to the invention, a cuvette sample may be irradiated in a known radiation field and analysed in order to provide calibration data for the specific batch of polymer. Hence, the optical transmission efficiency of the cuvette samples are quantified for a specific absorbed dose, and the calibration data thus obtained may then be used to convert the degree of opacity in the polymeric core after exposure to the value of a delivered dose, thereby providing means for the quantification of radiation levels.

In a preferred embodiment of the invention, the device may be enclosed in suitable wrapping means, or "bagged" in order to reduce the risk of contamination. Thus, the likelihood of the device becoming contaminated by, for example, a sample of radioactive dust is reduced, thereby limiting the chances of radioactive contaminant being exported from the area under investigation. Clearly, this approach offers significant benefits in terms of health and safety. Preferred wrapping means comprise thermoplastic materials, such as polyethylene or poly(vinyl chloride). Following removal of the device from the area under investigation, the wrapping means is removed from the device prior to analysis.

The analysis step of the method according to the invention involves the use of optical tomography to provide a 3D reconstruction of the polymeric core, followed by reverse ray tracing of the tracks captured within the core. In this way, each track is used to back project the radiation location to the relevant section of the area under investigation.

In the first step of this procedure, an optical tomography system is used to digitise the polymer core in three dimensions. This procedure involves placing the polymeric core inside a container which contains fluid with a matching refractive index to the polymeric core. Then, a light source is directed towards a suitable lens which converts the light into a parallel light source, and this light source is transmitted thorough the container to produce a single projection. The sample container is then rotated by a number of small angular increments in order to provide view points from multiple angles, after which an image reconstruction algorithm is used to reconstruct the sample in 3D by mathematically fusing the multiple views and projections.

From this 3D reconstruction of the polymeric core, it is then possible to reverse ray trace the tracks captured within the core by back projecting the radiation location onto the relevant perimeter of the domain of interest, which will generally comprise a wall or ceiling. In forming the image or map in this way, each hole in the collimation sheath effectively represents one pixel and, consequently, the greater the number of holes in the sheath, the better the resolution. In addition, it is found that positioning of the device is important in this regard in that better resolution also results the closer the device is to a perimeter, such as a wall or ceiling. The product of this stage in the process is, therefore, in the form of a number of images. Thus, if a device according to the invention is placed in a cubic space on the floor, five images will be produced, four of which represent each wall, with the fifth representing the ceiling. In addition to providing data regarding the delivered dose, the method of the invention may also facilitate a further set of images allowing for the construction of maps relating to the types of isotope which are present.

The device is a non-electrical unit, operating without the necessity for an electrical supply, and it is capable of providing accurate survey data and hazard analysis. The device offers safety benefits, since it reduces dose exposure to operators and eliminates the need for cumbersome, heavy equipment. Furthermore, the output enables safe decommissioning and decontamination strategies to be developed. The device of the invention has a major advantage over the devices of the prior art in that it is able to deal with high radiation backgrounds and to be deployed in confined or restricted spaces. The device is placed in a suitable location where the presence of radiation is to be detected, and allowed to remain in situ for the required exposure time. The device is then recovered and analysed to provide a reconstructed image of the location and type of radiation hazard within the domain of interest.

Previous means for undertaking this task had generally involves the use of hand held dosimeters, or the Radscan® 800 previously discussed. However, the hand held devices may not be used in high radiation backgrounds, due to concerns for the safety of operatives, and are of limited value in confined spaces, since operatives may not be able to access these areas, whilst the Radscan® 800 has disadvantages in terms of cost and the requirement for a nearby supply of electricity, which clearly limits the locations in which it may be used. The device of the present invention suffers none of these disadvantages.

The device and method of the invention principally find application in pre-decontamination operations, by facilitating mapping of the type and location of radiation hazards in nuclear facilities, where there is either reduced access due to confined space or unacceptably high background radiation levels, which may be too high to allow for safe access, or to permit use of electrical components. The technology can thus be used to map the whereabouts and type of radiation on nuclear plants, gloveboxes, in cells, confined spaces, and other radioactive environments confined by shielding, for example between two or more containment walls on a nuclear storage facility or in military facilities following radiation release. Hence, the device and method have potential use in many military and security related applications.

DESCRIPTION OF THE DRAWINGS

The method of the present invention will now be illustrated by reference to the accompanying figures, wherein.

Figure 1:
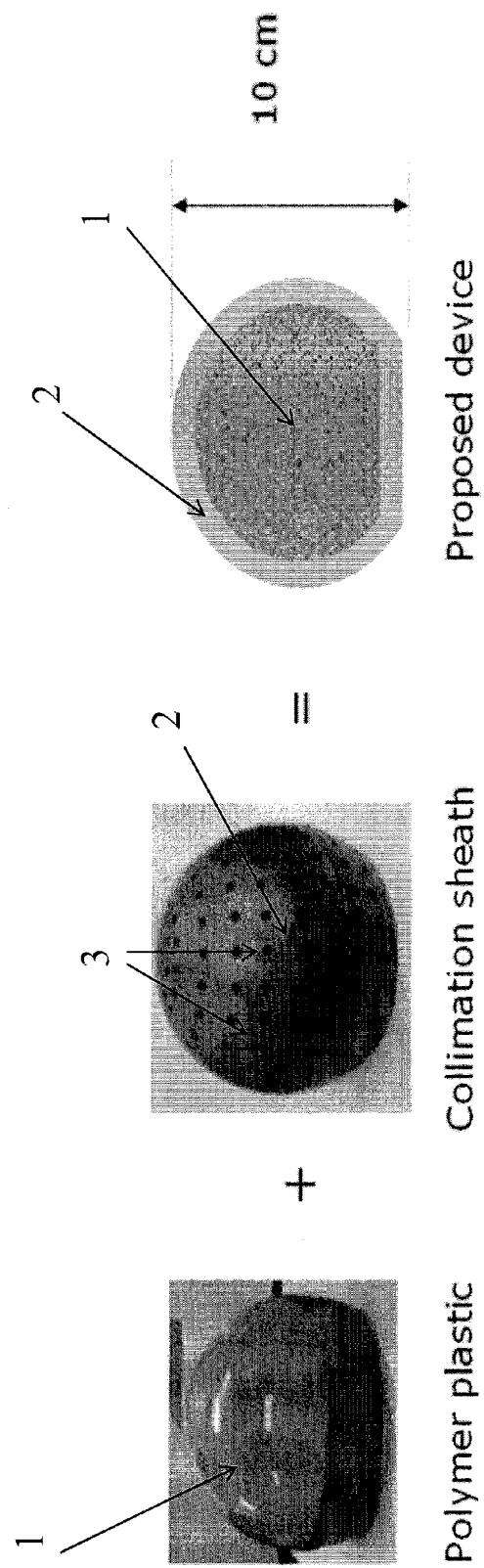
FIG. 1 shows a diagram of a device according to the invention comprising a core material and an external shell.

Considering firstly FIG. 1, from the left there is seen a polymeric core material 1 having a truncated spherical shape followed by a shell material in the form of a collimation sheath 2, the surface of which includes holes 3 through which radiation may pass in order to be incident on the core material. The final image on the right of FIG. 1 depicts a device according to the invention comprising the core material 1 removably located within the external shell 2, the device in this particular embodiment having a height of 10 cm.

Figure 2:
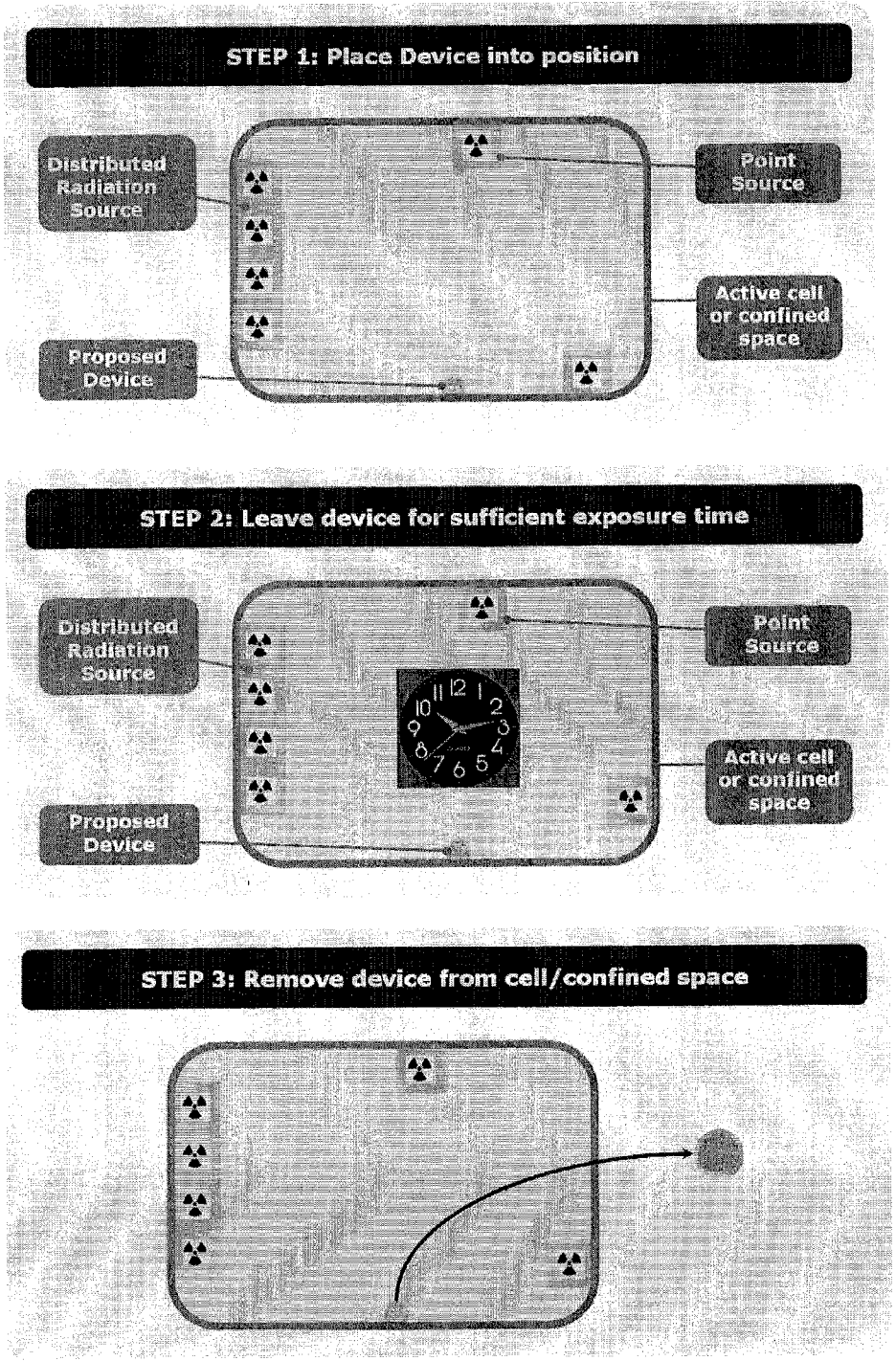
FIG. 2 illustrates the stages involved in the detection and mapping of radiation by the device of the invention.
Figure 2:
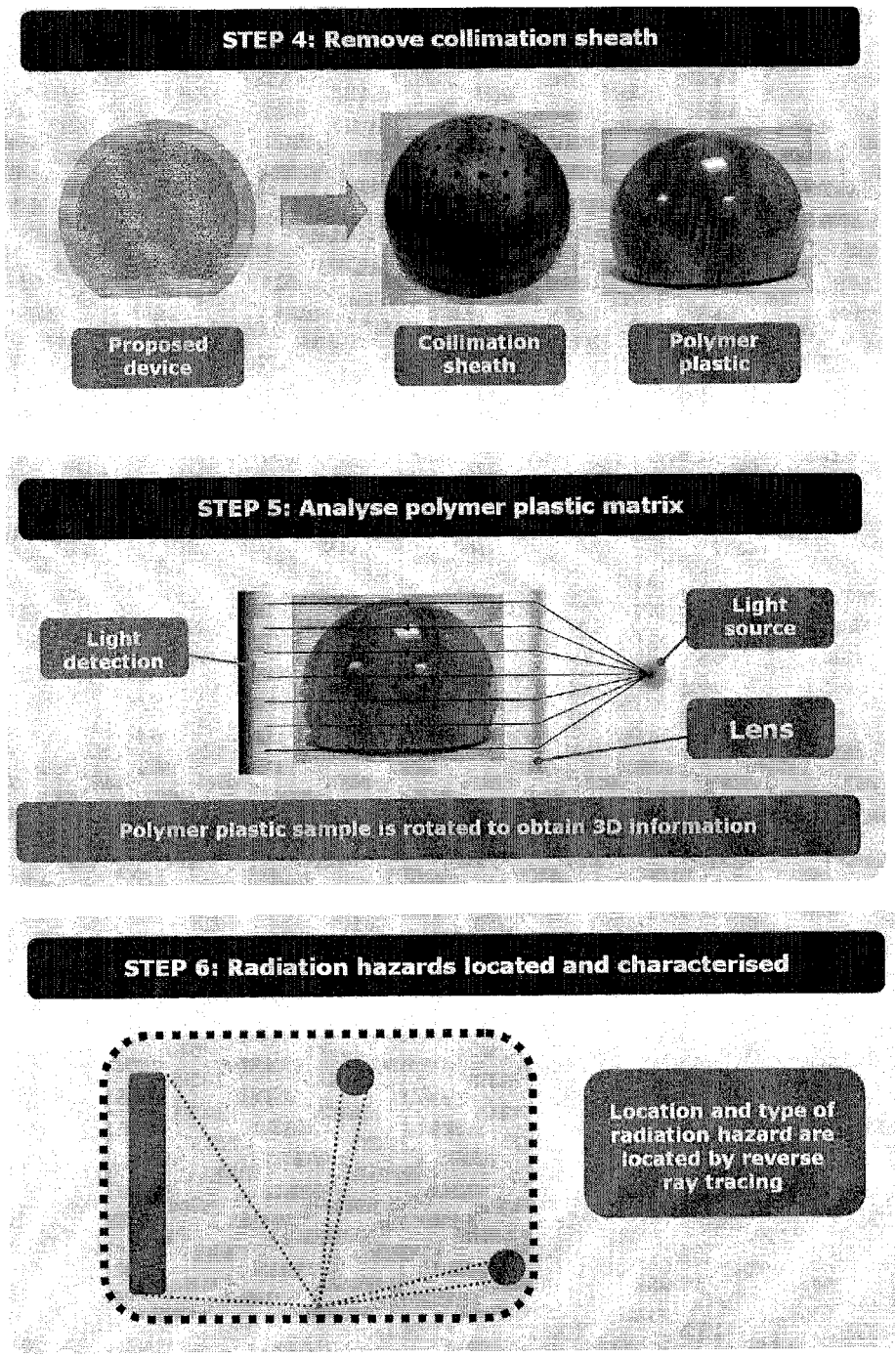

With reference to FIG. 2, it is seen that in Step 1 the device, in operation, is placed at a known position inside the area of interest. As previously discussed, the device may optionally be 'bagged', i.e. placed in suitable wrapping means, in order to reduce the risk of contamination. In addition, it is important that care is taken to ensure that the device is facing in a specific and known direction. Furthermore, the geometry of the cell or confined space should be known, since this information is necessary during the analysis procedure and image reconstruction process.

In Step 2, the device is allowed to remain in the chosen environment for an appropriate exposure time, which is dependent upon the sensitivity of the polymeric core material as well as the background radiation levels within the given cell/confined space. The sensitivity of the core material is maximised during manufacture, and calibration data are provided for given batches in advance of deployment to allow for the determination of suitable times of exposure.

At the conclusion of the exposure time, the device is removed from the environment under investigation, as illustrated at Step 3. At this point, if appropriate, the device may be 'de-bagged' so as to remove the temporary wrapping means and thereby minimise the spread of contamination. Optionally, but preferably, the recovered device should then be placed in a refrigerator for pre-analysis storage.

In Step 4, the polymeric core is then removed from the outer sheath prior to analysis by optical tomography. The lead outer sheath shall be re-used for the next application, and this feature is a very significant factor in cost reduction with the devices of the invention.

The polymeric core is then analysed using an optical tomography system, as illustrated in Step 5. This procedure digitises the opacity of the polymer plastic core in three dimensions, and provides the basis for the subsequent radiation hazard assessment analysis shown in Step 6, wherein a reverse ray tracing technique is used to back-project the location and type of radiation hazard using the positional placement of the design and the assigned cell/confined space geometry.

Figure 3:
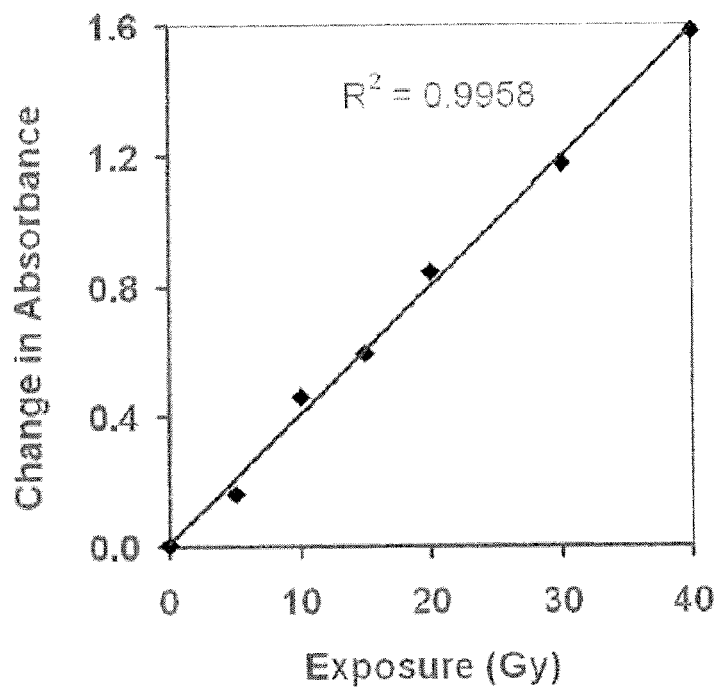
FIG. 3 is a graphical representation of the response (change in opacity) of PRESSAGE™ polymer to Cobalt-60 gamma radiation (in Grays)

Turning to FIG. 3, this includes experimental data relating to the radiation response of PRESSAGE™ polymer material, and the opacity/colour change data obtained may then be utilised to obtain an indication of the intensity of the radiation.

Figure 4:
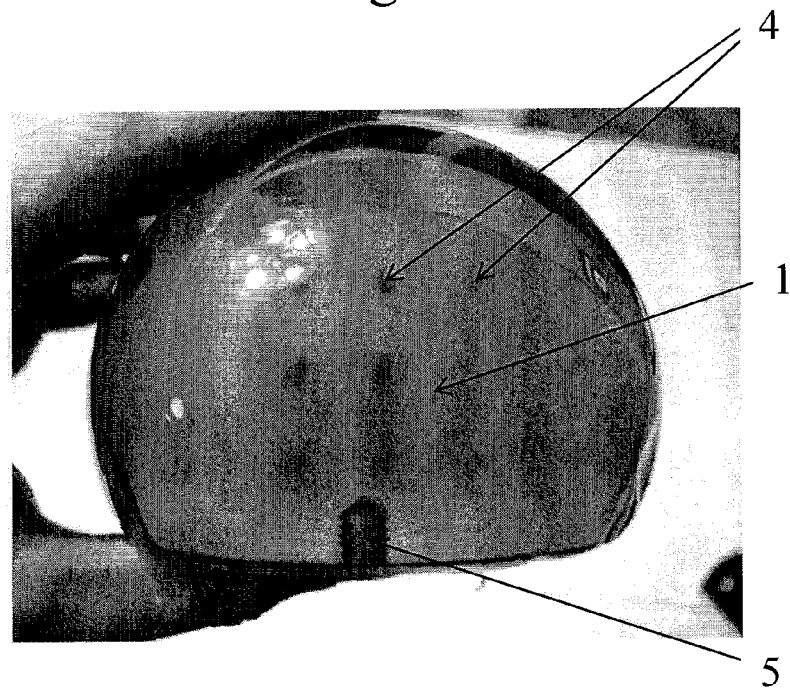
FIG. 4 provides an illustration of the effects of irradiation of a spherical PRESSAGE™ polymer sample.

Looking now at FIG. 4, there is seen an illustration of a number of radiation tracks 4 captured inside a PRESSAGE™ polymer core 1 during irradiation of a truncated spherical polymer sample when used in conjunction with a collimation sheath. Also visible is the impression 5 left by one of the spikes located on the inside of the base of the sheath for securing the core 1 in the sheath.

Figure 5:
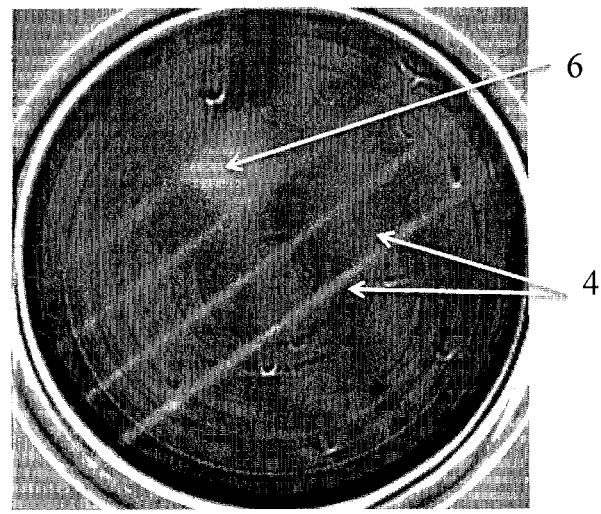
FIG. 5 shows an optical CT derived slice through a spherical PRESSAGE™ polymer sample, which is the result of optical scanning of the polymer sample.

When viewing FIG. 5, radiation tracks 4 can clearly be seen across the PRESSAGE™ polymer sample. Also in view is a section 6 of the polymer that was irradiated through a larger square shaped collimation hole.

Figure 6:
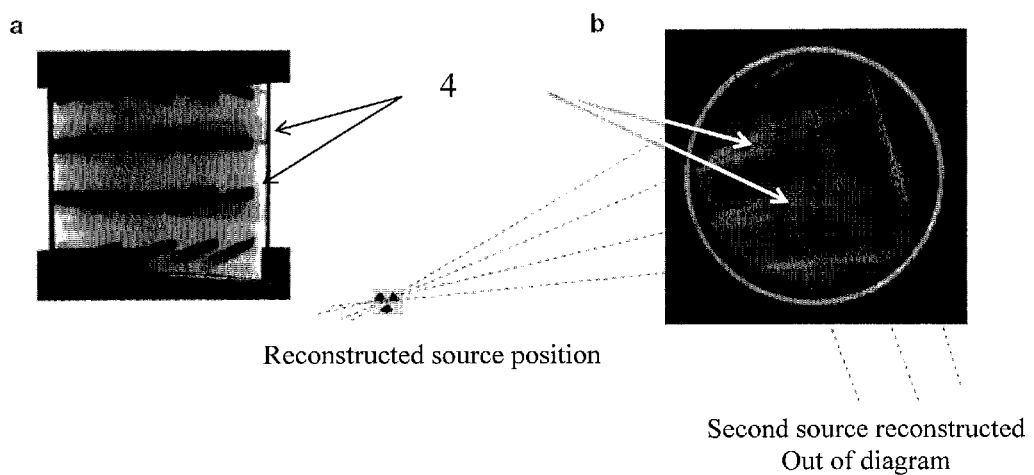
FIG. 6 illustrates the results obtained from an experiment using a reverse ray tracing technique in conjunction with a cylindrical PRESSAGE™ polymer sample.

Finally, FIG. 6 shows (a) a side view and (b) a plan view of the results from a reverse ray tracing experiment using a cylindrical PRESSAGE™ polymer sample, wherein the tracks 4 can clearly be seen in three dimensions. The images were produced using data from the same optical CT scanner which is used to scan the polymer sample once irradiated, and the orientation of the tracks may be used to locate the radiation source.

The invention claimed is:

1. A device for the detection and mapping of radiation emitted by radioactive materials, said device comprising a polymeric core located within an external shell material, wherein said polymeric core comprises a cubic, cylindrical, or spherical core or truncated spherical core of at least one radiation sensitive component which is sensitive to gamma-radiation emitted by said radioactive materials, and said external shell comprises a collimation sheath.

2. The device as claimed in claim 1 wherein said external shell is shaped in the same way as said core.

3. The device as claimed in claim 1 which comprises a truncated spherical shape and has a diameter in the region of 5 to 20 cm.

4. The device as claimed in claim 1 wherein said polymeric material comprises at least one of an epoxy polymer or a polyurethane.

5. The device as claimed in claim 1 wherein said polymeric core material comprises a colour change material which optionally comprises at least one leuco compound of a fluoran or di- or triarylmethane dye, and wherein said leuco compound optionally comprises Leuco Malachite Green or Crystal Violet Lactone.

6. The device as claimed in claim 1, wherein said collimation sheath comprises a shell including a plurality of holes.

7. The device as claimed in claim 1 wherein said collimation sheath comprises a metal which is machinable and or castable and which is optionally selected from iron, steel, aluminium, gallium, or their alloys, lead or tungsten.

8. The device as claimed in claim 1 wherein the thickness of the shell material is in the region of from 1 to 15 mm.

9. The device as claimed in claim 6, wherein the cross-sectional area of the holes in said collimation sheath is generally in the region of between 0.5 mm$^2$ and 25 mm$^2$.

10. The device as claimed in claim 6, wherein said holes are spaced apart on the surface of the collimation sheath by between 0.25 cm and 2 cm.

11. The device as claimed in claim 1, wherein said collimation sheath is removable from the polymeric core material following radiation exposure, and may be reused in further devices according to claim 1.

12. A method for the detection and mapping of radiation in a location, wherein said method comprises:
 (a) placing a device according to claim 1 in the location to be investigated;
 (b) allowing said device to remain in said location and be exposed to said radiation for a predetermined length of time;
 (c) removing said device from said location;
 (d) removing the polymeric core from the external shell; and
 (e) analysing said polymeric core by means of an optical analysis technique applying a software-based image reconstruction algorithm in order to determine the location, form and intensity of said radiation.

13. The method as claimed in claim 12 wherein said exposure takes place to a level of between 5 may and 100 Gy.

14. The method as claimed in claim 12 wherein said analysis of said polymeric core material is carried out by means of:
 (a) optical tomography in order to digitise the opacity of the core in three dimensions; and
 (b) subsequent application of a reverse ray tracing technique in order to back-project the location and nature of the radiation by utilising a knowledge of the positional placement of the design and the assigned cell/confined space geometry.

15. The method as claimed in claim 12 which comprises mapping the location, intensity and identity of radiological hazards in three dimensions in active cells, gloveboxes, other active plants and confined spaces or for use in decommissioning and decontamination operations.

* * * * *